United States Patent
Bao et al.

(10) Patent No.: US 12,245,188 B2
(45) Date of Patent: Mar. 4, 2025

(54) PAGING INDICATION METHOD, PAGING METHOD, TERMINAL AND NETWORK SIDE DEVICE

(71) Applicant: VIVO MOBILE COMMUNICATION CO., LTD., Guangdon (CN)

(72) Inventors: Wei Bao, Dongguan (CN); Fei Yang, Dongguan (CN); Feng Zhu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 801 days.

(21) Appl. No.: 17/378,605

(22) Filed: Jul. 16, 2021

(65) Prior Publication Data

US 2021/0345292 A1    Nov. 4, 2021

Related U.S. Application Data

(63) Continuation of application No. PCT/CN2020/072783, filed on Jan. 17, 2020.

(30) Foreign Application Priority Data

Jan. 18, 2019   (CN) .......................... 201910108510.3

(51) Int. Cl.
*H04W 68/00* (2009.01)
*H04W 28/02* (2009.01)
*H04W 76/27* (2018.01)

(52) U.S. Cl.
CPC ..... *H04W 68/005* (2013.01); *H04W 28/0268* (2013.01); *H04W 76/27* (2018.02)

(58) Field of Classification Search
CPC .............. H04W 68/005; H04W 76/27; H04W 28/0268
See application file for complete search history.

(56) References Cited

U.S. PATENT DOCUMENTS

| | | | |
|---|---|---|---|
| 8,718,675 | B1 | 5/2014 | Choi et al. |
| 2010/0124223 | A1 | 5/2010 | Gibbs et al. |
| 2011/0141885 | A1 | 6/2011 | Chen |
| 2012/0236709 | A1 | 9/2012 | Ramachandran et al. |
| 2013/0303203 | A1 | 11/2013 | Wang et al. |
| 2014/0228070 | A1 | 8/2014 | Josso et al. |
| 2016/0112084 | A1 | 4/2016 | Parron et al. |

(Continued)

FOREIGN PATENT DOCUMENTS

| | | |
|---|---|---|
| CN | 1937839 A | 3/2007 |
| CN | 101459936 A | 6/2009 |

(Continued)

OTHER PUBLICATIONS

International Search Report and Written Opinion of the International Searching Authority regarding International Patent Application No. PCT/CN2020/072783, dated Apr. 22, 2020. Translation provided by Bohui Intellectual Property.

(Continued)

*Primary Examiner* — Curtis B Odom
(74) *Attorney, Agent, or Firm* — Harness, Dickey & Pierce, P.L.C.

(57) ABSTRACT

A paging indication method includes reporting first information. The first information is used to instruct a network side device to initiate a trigger condition of first paging to the terminal.

20 Claims, 5 Drawing Sheets

(56) References Cited

U.S. PATENT DOCUMENTS

2017/0150545 A1     5/2017    Ramkumar et al.
2017/0359813 A1    12/2017    Lee
2020/0037380 A1*    1/2020    Qiu ..................... H04W 68/12

FOREIGN PATENT DOCUMENTS

| | | | |
|---|---|---|---|
| CN | 102217275 | A | 10/2011 |
| CN | 102573065 | A | 7/2012 |
| CN | 103404203 | A | 11/2013 |
| CN | 105515723 | A | 4/2016 |
| CN | 105530024 | A | 4/2016 |
| EP | 3200370 | A1 | 8/2017 |
| JP | 2014512742 | A | 5/2014 |

OTHER PUBLICATIONS

First Office Action regarding Chinese Patent Application No. 201910108510.3, dated Dec. 3, 2020. Translation provided by Bohui Intellectual Property.

Second Office Action regarding Chinese Patent Application No. 201910108510.3, dated Jul. 2, 2021. Translation provided by Bohui Intellectual Property.

First Office Action regarding Japanese Patent Application No. 2021-541171, dated Jul. 8, 2022. Translation provided by Bohui Intellectual Property.

Second Office Action regarding Japanese Patent Application No. 2021-541171, dated Feb. 9, 2023. Translation provided by Bohui Intellectual Property.

First Office Action regarding European Patent Application No. 20741583.7, dated Apr. 19, 2023.

Supplementary European Search Report regarding Patent Application No. 20741583.7-1212/3914000; PCT/CN2020/072783, dated Feb. 16, 2022.

* cited by examiner

Report first information, where the first information is used to instruct a network side device to initiate a trigger condition of first paging to a terminal — 11

FIG. 1

A terminal controls, on a first occasion after a first SIM card enters an RRC connected state, a second SIM card to enter the RRC connected state from a non-connected state, and reports first information, where the first information is used to instruct a network side device to initiate a trigger condition of first paging to the terminal, and an identifier of the terminal in the first paging is an identifier associated with an RRC entity and/or a NAS entity corresponding to the second SIM card — 21

FIG. 2

PAGING INDICATION METHOD, PAGING METHOD, TERMINAL AND NETWORK SIDE DEVICE

CROSS-REFERENCE TO RELATED APPLICATIONS

This application is a Bypass Continuation Application of PCT/CN2020/072783 filed on Jan. 17, 2020, which claims priority to Chinese Patent Application No. 201910108510.3 filed on Jan. 18, 2019, which are incorporated herein by reference in their entirety.

TECHNICAL FIELD

Embodiments of the present disclosure relate to the field of wireless communications technologies, and in particular, to a paging indication method, a paging method, a terminal, and a network side device.

BACKGROUND

In current paging mechanism, regardless of a type of a current service, paging of a terminal is performed as long as the service arrives. If the terminal is performing a high-priority service (such as a game), a user may be unwilling to receive paging of a low-priority service. Otherwise, the high-priority service may be interrupted, thereby resulting in poor user experience.

SUMMARY

According to a first aspect, an embodiment of the present disclosure provides a paging indication method, applied to a terminal and including:
  reporting first information, where the first information is used to indicate a trigger condition for a network side device to determine whether to initiate first paging to the terminal.

According to a second aspect, an embodiment of the present disclosure provides a paging method, applied to a network side device and including:
  receiving first information, where the first information is used to indicate a trigger condition for a network side device to determine whether to initiate first paging to the terminal;
  determining, based on the trigger condition after a service of the terminal arrives, whether to initiate the first paging; and
  if no, quitting initiating the first paging.

According to a third aspect, an embodiment of the present disclosure provides a terminal, including:
  a processing module, configured to report first information, where the first information is used to indicate a trigger condition for a network side device to determine whether to initiate first paging to the terminal.

According to a fourth aspect, an embodiment of the present disclosure provides a network side device, including:
  a receiving module, configured to receive first information, where the first information is used to indicate a trigger condition for a network side device to determine whether to initiate first paging to the terminal; and
  a processing module, configured to: determine, based on the trigger condition after a service of the terminal arrives, whether to initiate the first paging; and if no, quit initiating the first paging.

According to a fifth aspect, an embodiment of the present disclosure provides a terminal, including a processor, a memory, a computer program that is stored in the memory and executable on the processor, and when the processor executes the computer program, the steps of the foregoing paging indication method are implemented.

According to a sixth aspect, an embodiment of the present disclosure provides a network side device, including a processor, a memory, a computer program that is stored in the memory and executable on the processor, and when the processor executes the computer program, the steps of the foregoing paging method are implemented.

According to a seventh aspect, an embodiment of the present disclosure provides a non-transitory computer-readable storage medium. The non-transitory computer-readable storage medium stores a computer program, and when a processor executes the computer program, the steps of the foregoing paging indication method or the steps of the foregoing paging method are implemented.

BRIEF DESCRIPTION OF DRAWINGS

It becomes clear for persons skilled in the art to learn various other advantages and benefits by reading detailed description of the following optional implementations. Accompanying drawings are merely used for showing the optional implementations, but not considered as a limitation on the present disclosure. In all accompanying drawings, a same reference symbol is used to indicate a same part. In the accompanying drawings:

FIG. 1 is a schematic flowchart of a paging indication method according to an embodiment of the present disclosure;

FIG. 2 is a schematic flowchart of a paging indication method according to another embodiment of the present disclosure:

DESCRIPTION OF EMBODIMENTS

Figure 3:
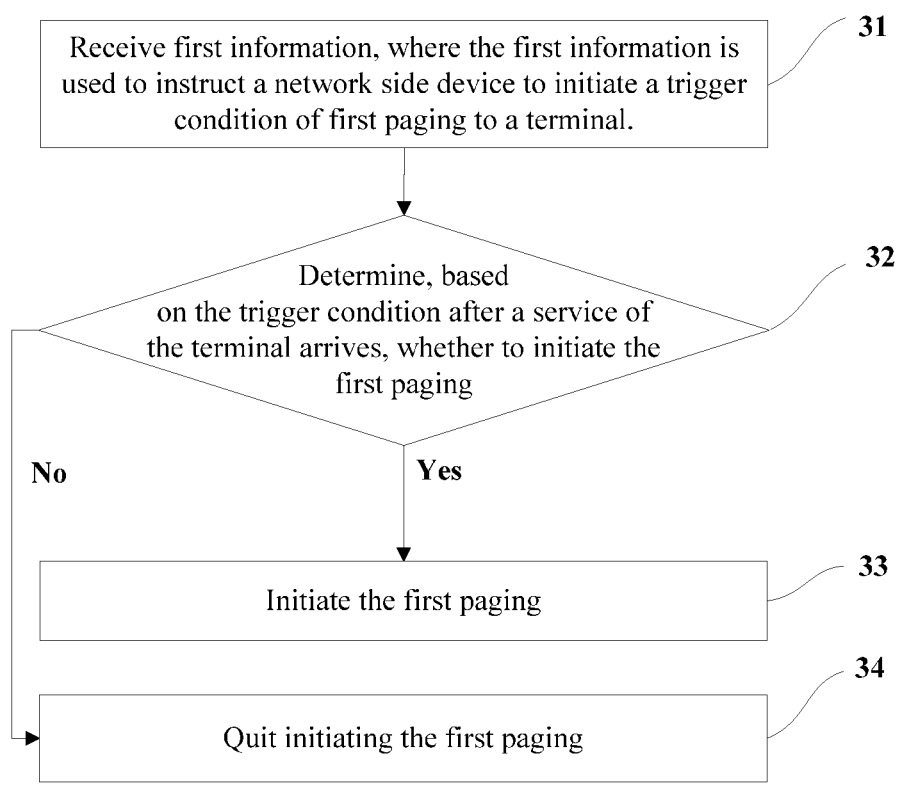
FIG. 3 is a schematic flowchart of a paging method according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of connected objects. For example, A and/or B represents the following three cases: Only A exists, only B exists, and both A and B exist.

In the embodiments of the present disclosure, the word such as "example" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The embodiments of the present disclosure are described below with reference to the accompanying drawings. A paging indication method, a paging method, a terminal, and a network side device provided in the embodiments of the present disclosure may be applied to a wireless communications system. The wireless communications system may be a 5G system, or an evolved long term evolution (eLTE) system, or a subsequent evolved communications system.

An embodiment of the present disclosure provides a wireless communications system. The wireless communications system may include a network side device and a terminal. The terminal may be connected to the network side device.

It should be noted that the foregoing communications system may include a plurality of terminals, and the network side device may communicate (transmit signaling or transmit data) with the plurality of terminals.

The network side device provided in this embodiment of the present disclosure may be a base station, and the base station may be a commonly used base station, or may be an evolved NodeB (eNB), or may be a device such as a network side device (such as a next generation NodeB (gNB) or a transmission and reception point (TRP)) or a cell in a 5G system, or a network side device in a subsequent evolved communications system. However, the foregoing terms do not constitute a limitation.

The network side device provided in this embodiment of the present disclosure may be alternatively a core network device. The core network device may be connected to the terminal by using an access network device.

The terminal provided in this embodiment of the present disclosure may be a mobile phone, a tablet computer, a notebook computer, an ultra-mobile personal computer (UMPC), a netbook, a personal digital assistant (PDA), or the like. A person skilled in the art may understand that the terms used constitute no limitation.

Referring to FIG. 1, FIG. 1 is a schematic flowchart of a paging indication method according to an embodiment of the present disclosure. The paging indication method is applied to a terminal and includes the following steps.

Step 11: Report first information, where the first information is used to indicate a trigger condition for a network side device to determine whether to initiate first paging to the terminal.

In this embodiment of the present disclosure, after a service of the terminal arrives, the network side device may determine, based on the condition reported by the terminal, whether to page the terminal, instead of paging the terminal as long as the service of the terminal arrives, to avoid interruption from paging triggered by a low-priority service to an ongoing high-priority service, thereby improving user experience.

In this embodiment of the present disclosure, after the reporting first information, the method may further include:

reporting second information, where the second information is used to instruct the network side device to remove the trigger condition.

In other words, the terminal may remove the trigger condition as required.

In this embodiment of the present disclosure, the terminal may be a single-SIM terminal, and the single-SIM terminal is a terminal mounted with one subscriber identity module (SIM) card.

In this embodiment of the present disclosure, the terminal may be alternatively a multi-SIM multi-standby single-pass terminal.

Due to a limitation of hardware of the multi-SIM multi-standby single-pass terminal, only one SIM card can communicate with a network side by using an uplink and/or a downlink of the terminal at one moment.

It is assumed that the terminal includes a first SIM card and a second SIM card. When the first SIM card of the terminal is communicating by using an uplink and a downlink (a radio resource control (RRC) state corresponding to the first SIM card is an RRC connected state), to enable the terminal to receive a paging message of another card (such as the second SIM card) (an RRC state corresponding to the second SIM card is a non-connected state, and the non-connected state is an idle state or an inactive state), paging of the second SIM card is generally received in a manner similar to a time division multiplexing (TDM) receiving manner. The TDM manner means that when a paging occasion (PO, periodically appearing) of the second SIM card is to arrive, the terminal temporarily suspends use of the downlink by the first SIM card, so that the second SIM card uses the downlink to receive the paging.

Because duration of the PO is relatively short, the terminal attempts to receive the paging message of the second SIM card on the PO corresponding to the second SIM card in the TDM manner, which does not greatly affect data transmission of the first SIM card. However, once the paging message for the second SIM card is received on the PO corresponding to the second SIM card, an RRC entity corresponding to the second SIM card needs to enter the RRC connected state, and then obtains detailed information about a service that triggers paging, for example, a service type: a voice service, an SMS service, and a data service. A process in which the RRC entity corresponding to the second SIM card enters the RRC connected state and obtains the detailed information about the service that triggers paging is relatively long. In this period, a service of the first SIM card is interrupted. If the first SIM card is running a high-priority service (such as a game), and paging of the second SIM card is triggered by a low-priority service (such as a data service-WeChat), service interruption of the first SIM card caused by the paging of the second SIM card needs to be avoided.

However, according to a paging mechanism in the related art, before the RRC entity corresponding to the second SIM card enters the connected state, which service triggers paging is unknown. In the paging mechanism in the related art, an ongoing high-priority service of the first SIM card may be interrupted by paging triggered by a low-priority service of the second SIM card, thereby resulting in poor user experience.

To resolve the foregoing problem, an embodiment of the present disclosure provides a paging indication method. Referring to FIG. 2, the paging indication method is applied to a terminal and includes the following steps.

Step 21: The terminal controls, on a first occasion after a first SIM card enters an RRC connected state, a second SIM card to enter the RRC connected state from a non-connected state, and reports first information, where the first information is used to indicate a trigger condition for a network side device to determine whether to initiate first paging to the terminal, and an identifier of the terminal in the first paging is an identifier associated with an RRC entity and/or a NAS entity corresponding to the second SIM card.

For example, the foregoing identifier may be a cell radio network temporary identifier (C-RNTI) allocated by a serving cell of logical UE corresponding to the second SIM card, or is an international mobile subscriber identity (IMSI) corresponding to the second SIM card, or is a temporary mobile subscriber identity (S-TMSI) obtained by logical UE corresponding to the second SIM card from a network side. The logical U is described below.

In this embodiment of the present disclosure, the non-connected state is an idle state or an inactive state.

In the present disclosure, the terminal is a multi-card multi-standby terminal, and the multi-card multi-standby terminal is a physical terminal device that can be mounted with a plurality of SIM cards. Each SIM card corresponds to one logical UE. The logical UE is a corresponding communication transceiver protocol function provided by a physical terminal for each SIM card, for example, including a protocol stack function of a non-access stratum (NAS), RRC, a packet data convergence protocol (PDCP), a radio link control protocol (RLC), or the like. Different logical UE may separately receive scheduling/configuration/power control commands of a network, and send/receive data under control of the network. Therefore, it may be understood that the physical terminal device is a physical carrier of a plurality of logical UE functions, and each logical UE function corresponds to one SIM card. In the present disclosure, an operation performed by each SIM card should be understood as an operation performed by logical UE corresponding to the SIM card. For example, that the first SIM card enters the RRC connected state should be understood as that logical UE corresponding to the first SIM card enters the RRC connected state.

In this embodiment of the present disclosure, the SIM card may be a physical card, or may be a virtual card, such as an embedded SIM card (eSIM). Each SIM card may correspond to one RRC entity, and RRC entities corresponding to different SIM cards may be in a same RRC state or different RRC states. For example, the terminal includes a first SIM card and a second SIM card. Both an RRC entity of the first SIM card and an RRC entity of the second SIM card may be in an idle state, or an RRC entity of the first SIM card is in a connected state, and an RRC entity of the second SIM card is in an idle state or an inactive state.

In this embodiment of the present disclosure, the first SIM card and the second SIM card may be SIM cards belonging to a same operator or a public land mobile network (PLMN), or may be SIM cards belonging to different operators or PLMNs.

In this embodiment of the present disclosure, optionally, the terminal is a multi-SIM multi-standby single-pass terminal, that is, only one SIM card can communicate with a network side by using an uplink and/or a downlink of the terminal at one moment.

In this embodiment of the present disclosure, reporting the first information by using the second SIM card is reporting the first information by using a non-access stratum (NAS) entity and/or an RRC entity of the second SIM card.

In this disclosure, paging of a SIM card means paging of a terminal mounted with the SIM card, and an identifier of the terminal in a paging message is an identifier associated with an RRC entity and/or a NAS entity corresponding to the SIM card.

In this embodiment of the present disclosure, the network side device is an access network device or a core network device.

In this embodiment of the present disclosure, after the second SIM card enters the RRC connected state from the non-connected state, optionally, the first SIM card is still in the RRC connected state or enters the inactive state. In this case, a radio frequency channel of the terminal is occupied by the second SIM card, and the first SIM card cannot communicate with the network side device.

In this embodiment of the present disclosure, the first occasion may be any moment before the second SIM card enters the RRC connected state after the first SIM card enters the RRC connected state.

In some embodiments of the present disclosure, optionally, the first occasion arrives after it is detected that there is no data transmission between the first SIM card and the network side device (that is, a transmission interval of the first SIM card). That there is no data transmission between the first SIM card and the network side device means that no data is sent or received by the first SIM card.

Optionally, the first occasion may arrive after the first SIM card enters the RRC connected state, or after it is detected for the first time that there is no data transmission between the first SIM card and the network side device, or after each time it is detected that there is no data transmission between the first SIM card and the network side device.

In some other embodiments of the present disclosure, optionally, the first occasion arrives after paging is received, where an identifier of the terminal in the paging is an identifier associated with the RRC entity and/or the NAS entity corresponding to the second SIM card. That is, the first occasion arrives after paging for the second SIM card is received.

Optionally, the first occasion may arrive after the first SIM card enters the RRC connected state, or after it is detected for the first time that the second SIM card is paged, or after each time it is detected that the second SIM card is paged.

In some other embodiments of the present disclosure, optionally, the first occasion may arrive after a location update is actively triggered by the RRC entity or the NAS entity corresponding to the second SIM card. After the location update is triggered, the terminal initiates an RRC connection setup process. For example, when the NAS entity corresponding to the second SIM card triggers the terminal to perform a periodic tracking area update (Tracking Area Update, TAU) or an event-triggered TAU, RRC connection setup is performed, that is, the terminal sets up an RRC connection in a TAU process of the second SIM card, and incidentally reports the first information.

In this embodiment of the present disclosure, paging is sent on a paging occasion (PO) corresponding to a SIM card, and the PO appears periodically. The terminal receives a paging message at a PO time-frequency location corresponding to the SIM card.

In this embodiment of the present disclosure, because duration of one PO is relatively short, the terminal may receive the PO in a TDM manner. For example, when both the first SIM card and the second SIM card are in an idle state, if a time location of a PO corresponding to the first SIM card and a time location of a PO corresponding to the second SIM card do not overlap, the terminal may receive the POs corresponding to the two SIM cards in the TDM manner. When the first SIM card is in an RRC connected state and the second SIM card is in an idle or inactive state, the terminal may receive paging of the second SIM card at the time location of the PO of the second SIM card, and communicate with the network side by using the first SIM card at another time (other than a location of the PO of the second SIM card and a radio frequency adjustment time corresponding to switching between the first SIM card and the second SIM card). Because a transmission interruption time of the first SIM card caused by receiving the paging of the second SIM card is short, impact is relatively small.

In this embodiment of the present disclosure, optionally, the trigger condition includes:

service information for triggering initiating the first paging: or service information for quitting initiating the first paging, where the service information includes at least one of a service type, a paging reason, or a QoS class of a service.

In the present disclosure, the paging reason is a cause for triggering paging, such as an IMS service, a PS service, signaling transmission, and a positioning request.

In the present disclosure, the QoS class of the service is a QoS class list and a QoS class threshold. The former means that when a QoS class corresponding to a service that triggers paging belongs to the list, paging may be performed, that is, the list is a whitelist, or when a QoS class corresponding to a service that triggers paging belongs to the list, paging may not be performed, that is, the list is a blacklist. The latter means that when a QoS class corresponding to a service that triggers paging is greater than or equal to the threshold, paging is allowed to be triggered: otherwise, paging is not allowed to be triggered.

That is, the second SIM card may report which service/paging reason/QoS class needs to trigger paging, or report which service/paging reason/QoS class does not need to trigger paging.

The service type may include a voice service, an SMS service, a data service, and the like.

In this embodiment of the present disclosure, that the second SIM card is controlled to enter the RRC connected state from the non-connected state means that the second SIM card is controlled to enter the RRC connected state through an RRC resume process or an RRC connection setup process.

In this embodiment of the present disclosure, optionally, after the terminal controls the second SIM card to enter the RRC connected state from the non-connected state, and reports the first information, the method further includes: controlling the second SIM card to enter the non-connected state from the RRC connected state, so that a service of the first SIM card can be continued.

In this embodiment of the present disclosure, optionally, after the terminal controls the second SIM card to enter the non-connected state from the RRC connected state, the method further includes: if it is detected that the first SIM card enters the non-connected state from the RRC connected state, or it is detected that a service of the first SIM card is completed, the terminal controls the second SIM card to enter the RRC connected state from the non-connected state, and report second information, where the second information is used to instruct the network side device to remove the trigger condition.

That is, when the first SIM card enters the non-connected state from the RRC connected state, or the service of the first SIM card is completed, the network side device may be instructed to remove the trigger condition for initiating the first paging to the terminal, and after removing the trigger condition, the network side device may initiate paging after a service of the second SIM card arrives, without determining whether to initiate the paging.

In this embodiment of the present disclosure, optionally, that the terminal controls, on a first occasion after a first SIM card enters an RRC connected state, a second SIM card to enter the RRC connected state from a non-connected state, and reports first information includes: if a service of the first SIM card is a first service, the terminal controls, on the first occasion after the first SIM card enters the RRC connected state, the second SIM card to enter the RRC connected state from the non-connected state, and reports the first information.

That is, only when the first SIM card executes some services (that is, the first service), the second SIM card is controlled to report the trigger condition: otherwise, the trigger condition is not reported.

Optionally, the first service is a service of a specified service type, a specified paging reason, and/or a specified QoS class. For example, the first service is some high-priority services.

In this embodiment of the present disclosure, optionally, when the first service is different, the trigger condition varies. For example, when the service of the first SIM is a game service, paging of an SMS service and a telephone service of the second SIM card may not be allowed to be triggered, or when the service of the first SIM card is a video service, paging of an SMS service of the second SIM card may not be allowed to be triggered. Certainly, when the first service is different, the trigger condition may also be the same.

In the related art, for a SIM card in a non-connected state, if downlink data needs to be sent to the terminal on the network side, paging is triggered. Based on different downlink data types, paging may be classified into different types (or causes), for example, a SIM card is paged due to a voice call. A SIM card is paged due to another data service (such as a WeChat message) (that a SIM card in this embodiment of the present disclosure is paged may be understood as that a terminal mounted with the SIM card is paged). In the related art, a paging message does not carry a paging type. If the terminal receives the paging message, the terminal controls a corresponding SIM card to enter the connected state to receive downlink data. That is, according to a paging mechanism in the related art, before a SIM card enters the connected state, which service triggers paging is unknown. In the paging mechanism in the related art, an ongoing high-priority service of another SIM card may be interrupted by paging triggered by a low-priority service of the SIM card, thereby resulting in poor user experience.

In this embodiment of the present disclosure, on the first occasion after the first SIM card of the terminal enters the RRC connected state, the second SIM card is controlled to enter the RRC connected state from the non-connected state, and a condition for triggering paging of the second SIM card is reported by using the second SIM card. Therefore, after a service of the second SIM card arrives, the network side device determines, based on the condition reported by the second SIM card, whether to page the second SIM card, instead of paging the second SIM card as long as the service of the second SIM card arrives, to avoid interruption from paging triggered by a low-priority service of the second SIM card to an ongoing high-priority service of the first SIM card, thereby improving user experience.

Referring to FIG. 3, FIG. 3 is a schematic flowchart of a paging method according to an embodiment of the present disclosure. The paging method is applied to a network side device and includes the following steps.

Step 31: Receive first information, where the first information is used to indicate a trigger condition for a network side device to determine whether to initiate first paging to the terminal.

Step 32: Determine, based on the trigger condition after a service of the terminal arrives, whether to initiate the first paging; and if yes, perform step 33; otherwise, perform step 34.

Step 33: Initiate the first paging.

Step 34: Quit initiating the first paging.

In this embodiment of the present disclosure, after the service of the terminal arrives, the network side device may determine, based on the condition reported by the terminal, whether to page the terminal, instead of paging the terminal as long as the service of the terminal arrives, to avoid interruption from paging triggered by a low-priority service to an ongoing high-priority service, thereby improving user experience.

In some embodiments of the present disclosure, the terminal is a multi-SIM multi-standby terminal, and an identifier of the terminal in the first paging is an identifier associated with an RRC entity and/or a NAS entity corresponding to a second SIM card.

The determining, based on the trigger condition after a service of the terminal arrives, whether to initiate the first paging includes: determining, based on the trigger condition after a service of the second SIM card arrives, whether to initiate the first paging.

In this embodiment of the present disclosure, optionally, the trigger condition includes:
  service information for triggering initiating the first paging: or
  service information for quitting initiating the first paging, where
  the service information includes at least one of a service type, a paging reason, or a QoS class of a service.

In this embodiment of the present disclosure, paging is sent on a paging occasion (PO) corresponding to a SIM card, and the PO appears periodically. The terminal receives a paging message at a PO time-frequency location corresponding to the SIM card.

In this embodiment of the present disclosure, optionally, the paging method further includes: receiving second information, where the second information is used to instruct the network side device to remove the trigger condition.

After receiving the second information, the network side device may remove the trigger condition. After the service of the terminal arrives, the network side device initiates paging, and no longer determines whether to initiate the paging.

In this embodiment of the present disclosure, optionally, after the receiving second information, the method further includes: initiating paging after the service of the second SIM card arrives, without determining whether to initiate the paging, to prevent the terminal from missing a paging service.

In this embodiment of the present disclosure, the network side device receives a condition that is used for triggering paging of the second SIM card and that is reported by the second SIM card. After the service of the second SIM card arrives, the network side device determines, based on the condition reported by the second SIM card, whether to page the second SIM card, instead of paging the second SIM card as long as the service of the second SIM card arrives, to avoid interruption from paging triggered by a low-priority service of the second SIM card to an ongoing high-priority service of a first SIM card, thereby improving user experience.

Figure 4:
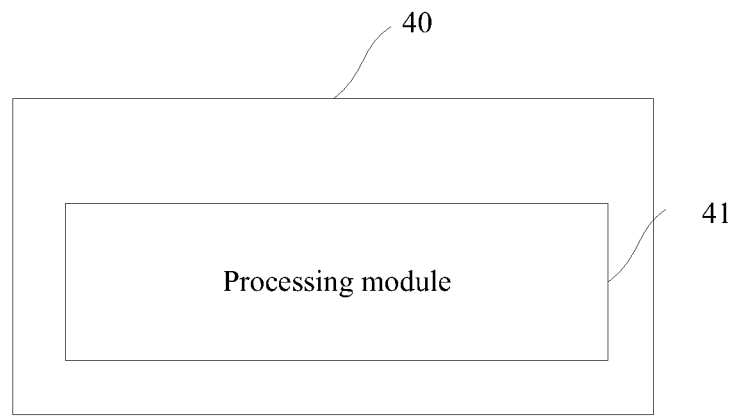
FIG. 4 is a schematic structural diagram of a terminal according to an embodiment of the present disclosure.

Referring to FIG. 4, FIG. 4 is a schematic structural diagram of a terminal according to an embodiment of the present disclosure. A terminal 40 includes:
  a processing module 41, configured to report first information, where the first information is used to indicate a trigger condition for a network side device to determine whether to initiate first paging to the terminal.

In this embodiment of the present disclosure, after a service of the terminal arrives, a network side device may determine, based on a condition reported by the terminal, whether to page the terminal, instead of paging the terminal as long as the service of the terminal arrives, to avoid interruption from paging triggered by a low-priority service to an ongoing high-priority service, thereby improving user experience.

In some embodiments of the present disclosure, the processing module 41 is configured to: control, on a first occasion after a first SIM card enters an RRC connected state, a second SIM card to enter the RRC connected state from a non-connected state, and report the first information, where the first information is used to indicate a trigger condition for a network side device to determine whether to initiate first paging to the terminal, and an identifier of the terminal in the first paging is an identifier associated with an RRC entity and/or a NAS entity corresponding to the second SIM card.

Optionally, the trigger condition includes:
  service information for triggering initiating the first paging: or
  service information for quitting initiating the first paging, where
  the service information includes at least one of a service type, a paging reason, or a QoS class of a service.

Optionally, the first occasion arrives after the NAS entity or the RRC entity corresponding to the second SIM card triggers a location update: or
  the first occasion arrives after it is detected that there is no data transmission between the first SIM card and the network side device: or
  the first occasion arrives after paging is received, where an identifier of the terminal in the paging is an identifier associated with the RRC entity and/or the NAS entity corresponding to the second SIM card.

Optionally, the processing module is further configured to: after controlling the second SIM card to enter the RRC connected state from the non-connected state and reporting the first information, control the second SIM card to enter the non-connected state from the RRC connected state.

Optionally, the processing module is further configured to: after controlling the second SIM card to enter the non-connected state from the RRC connected state, if it is detected that the first SIM card enters the non-connected state from the RRC connected state, or it is detected that a service of the first SIM card is completed, control the second SIM card to enter the RRC connected state from the non-connected state, and report second information, where the second information is used to instruct the network side device to remove the trigger condition.

Optionally, the processing module is configured to: if a service of the first SIM card is a first service, control, on the first occasion after the first SIM card enters the RRC connected state, the second SIM card to enter the RRC connected state from the non-connected state, and report the first information.

Optionally, the first service is a service of a specified service type, a specified paging reason, and/or a specified QoS class.

In this embodiment of the present disclosure, on the first occasion after the first SIM card of the terminal enters the RRC connected state, the second SIM card is controlled to enter the RRC connected state from the non-connected state, and a condition for triggering paging of the second SIM card is reported by using the second SIM card. Therefore, after a service of the second SIM card arrives, the network side device determines, based on the condition reported by the second SIM card, whether to page the second SIM card, instead of paging the second SIM card as long as the service of the second SIM card arrives, to avoid interruption from paging triggered by a low-priority service of the second SIM card to an ongoing high-priority service of the first SIM card, thereby improving user experience.

Figure 5:
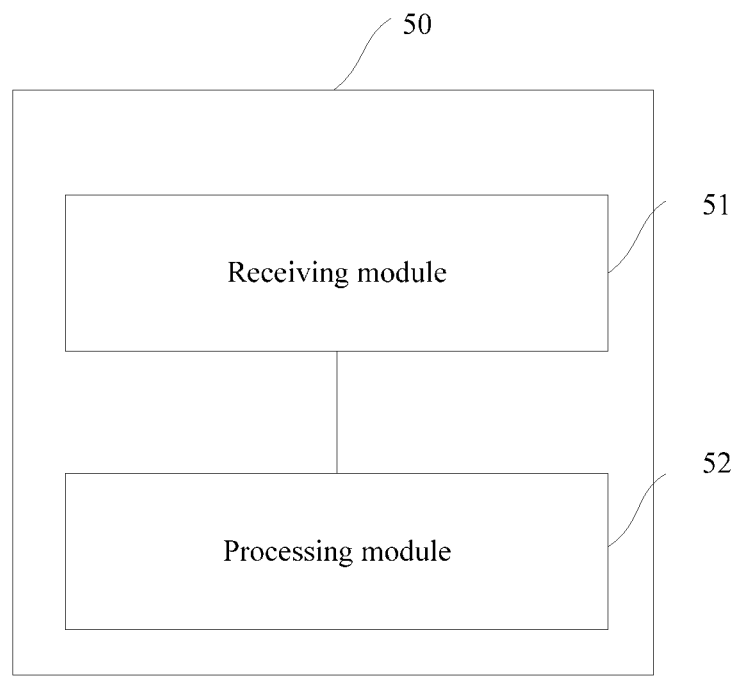
FIG. 5 is a schematic structural diagram of a network side device according to an embodiment of the present disclosure.

Referring to FIG. 5, FIG. 5 is a schematic structural diagram of a network side device according to an embodiment of the present disclosure. A network side device 50 includes:
- a receiving module 51, configured to receive first information, where the first information is used to indicate a trigger condition for a network side device to determine whether to initiate first paging to the terminal; and
- a processing module 52, configured to: determine, based on the trigger condition after a service of the terminal arrives, whether to initiate the first paging; and if no, quit initiating the first paging.

In this embodiment of the present disclosure, after the service of the terminal arrives, the network side device may determine, based on the condition reported by the terminal, whether to page the terminal, instead of paging the terminal as long as the service of the terminal arrives, to avoid interruption from paging triggered by a low-priority service to an ongoing high-priority service, thereby improving user experience.

In this embodiment of the present disclosure, the processing module 52 is further configured to initiate the first paging when the trigger condition indicates that the first paging needs to be initiated.

In some embodiments of the present disclosure, an identifier of the terminal in the first paging is an identifier associated with an RRC entity and/or a NAS entity corresponding to a second SIM card.

The processing module 52 is configured to determine, based on the trigger condition after a service of the second SIM card arrives, whether to initiate the first paging.

Optionally, the trigger condition includes:
service information for triggering initiating the first paging; or
service information for quitting initiating the first paging, where
the service information includes at least one of a service type, a paging reason, or a QoS class of a service.

Optionally, the receiving module 51 is further configured to receive second information, where the second information is used to instruct the network side device to remove the trigger condition.

Optionally, the processing module 52 is further configured to: after the receiving module 51 receives the second information, initiating paging after the service of the second SIM card arrives, without determining whether to initiate the paging.

In this embodiment of the present disclosure, the network side device receives a condition that is used for triggering paging of the second SIM card and that is reported by the second SIM card. After the service of the second SIM card arrives, the network side device determines, based on the condition reported by the second SIM card, whether to page the second SIM card, instead of paging the second SIM card as long as the service of the second SIM card arrives, to avoid interruption from paging triggered by a low-priority service of the second SIM card to an ongoing high-priority service of a first SIM card, thereby improving user experience.

Figure 6:
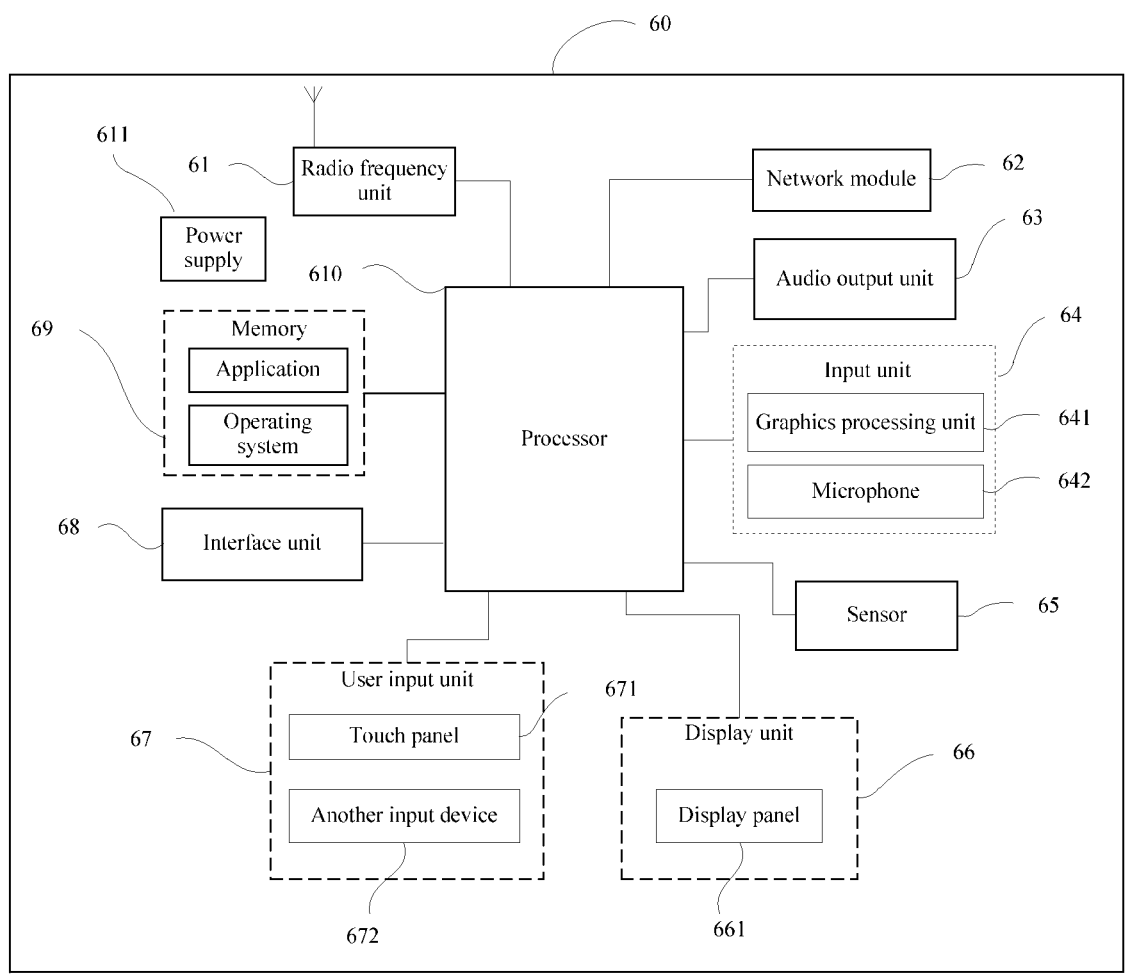
FIG. 6 is a schematic structural diagram of a terminal according to another embodiment of the present disclosure.

Referring to FIG. 6, FIG. 6 is a schematic structural diagram of a terminal according to another embodiment of the present disclosure. The terminal 60 includes but is not limited to: a radio frequency unit 61, a network module 62, an audio output unit 63, an input unit 64, a sensor 65, a display unit 66, a user input unit 67, an interface unit 68, a memory 69, a processor 610, a power supply 611, and other components. A person skilled in the art may understand that the structure of the terminal shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 610 is configured to: control, on a first occasion after a first SIM card enters an RRC connected state, a second SIM card to enter the RRC connected state from a non-connected state, and report first information.

In this embodiment of the present disclosure, after a service of the terminal arrives, the network side device may determine, based on the condition reported by the terminal, whether to page the terminal, instead of paging the terminal as long as the service of the terminal arrives, to avoid interruption from paging triggered by a low-priority service to an ongoing high-priority service, thereby improving user experience.

It should be understood that, in this embodiment of the present disclosure, the radio frequency unit 61 may be configured to receive and send information or a signal in a call process. For example, after receiving downlink data from a base station, the radio frequency unit 61 sends the downlink data to the processor 610 for processing. In addition, the radio frequency unit 61 sends uplink data to the base station. Generally, the radio frequency unit 61 includes but is not limited to an antenna, at least one amplifier, a transceiver, a coupler, a low noise amplifier, a duplexer, and the like. In addition, the radio frequency unit 61 may communicate with a network and another device through a wireless communication system.

The terminal provides a user with wireless broadband Internet access through the network module 62, for example, help the user send and receive emails, browse web pages, and access streaming media.

The audio output unit 63 may convert audio data received by the radio frequency unit 61 or the network module 62 or stored in the memory 69 into an audio signal and output the audio signal as a sound. In addition, the audio output unit 63 may further provide an audio output (for example, a call signal received voice, or a message received voice) related to a specific function implemented by the terminal 60. The audio output unit 63 includes a speaker, a buzzer, a telephone receiver, and the like.

The input unit 64 is configured to receive an audio signal or a video signal. The input unit 64 may include a graphics processing unit (GPU) 641 and a microphone 642, and the graphics processing unit 641 processes image data of a still picture or video obtained by an image capture apparatus (such as a camera) in a video capture mode or an image capture mode. A processed image frame may be displayed on the display unit 66. The image frame processed by the graphics processing unit 641 may be stored in the memory 69 (or another storage medium) or sent by using the radio frequency unit 61 or the network module 62. The microphone 642 may receive a sound and can process such sound into audio data. The processed audio data can be converted into a format that can be sent to a mobile communications base station through the radio frequency unit 61 in a telephone call mode, for outputting.

The terminal 60 further includes at least one type of sensor 65, such as a light sensor, a motion sensor, and another sensor. For example, the light sensor includes an ambient light sensor and a proximity sensor. The ambient light sensor may adjust luminance of the display panel 661 based on brightness of ambient light. The proximity sensor may turn off the display panel 661 and/or backlight when the terminal 60 moves to an ear. As a type of the motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), and the like. The sensor 65 may further include a fingerprint sensor, a pressure sensor, an iris sensor, a molecule sensor, a gyroscope, a barometer, a hygrometer, a thermometer, and an infrared sensor. Details are not described herein.

The display unit 66 is configured to display information input by a user or information provided to a user. The display unit 66 may include a display panel 661. The display panel 661 may be configured in a form of a liquid crystal display (LCD), an organic light-emitting diode (OLED), or the like.

The user input unit 67 may be configured to receive input numeral or character information, and generate key signal input related to user setting and functional control of the terminal. For example, the user input unit 67 includes a touch panel 671 and another input device 672. The touch panel 671 is also referred to as a touchscreen, and may collect a touch operation performed by a user on or near the touch panel 671 (such as an operation performed by a user on the touch panel 671 or near the touch panel 671 by using any proper object or accessory, such as a finger or a stylus). The touch panel 671 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 610, and receives and executes a command sent by the processor 610. In addition, the touch panel 671 can be implemented by various types such as a resistive type, a capacitive type, an infrared ray type or a surface acoustic wave type. The user input unit 67 may include another input device 672 in addition to the touch panel 671. For example, the another input device 672 may include, but is not limited to, a physical keyboard, functional keys (for example, a volume control key and a switch key), a trackball, a mouse, and a joystick. Details are not described herein again.

Optionally, the touch panel 671 may cover the display panel 661. When detecting the touch operation on or near the touch panel 671, the touch panel 671 transmits the touch operation to the processor 610 to determine a type of a touch event, and then the processor 610 provides corresponding visual output on the display panel 661 based on the type of the touch event. In FIG. 6, the touch panel 671 and the display panel 661 are used as two independent components to implement input and output functions of the terminal. However, in some embodiments, the touch panel 671 and the display panel 661 may be integrated to implement the input and output functions of the terminal. This is not specifically limited herein.

The interface unit 68 is an interface connecting an external apparatus to the terminal 60. For example, the external apparatus may include a wired or wireless headphone port, an external power supply (or a battery charger) port, a wired or wireless data port, a storage card port, a port used to connect to an apparatus having an identification module, an audio input/output (I/O) port, a video I/O port, and a headset port. The interface unit 68 may be configured to receive input (for example, data information and power) from an external apparatus and transmit the received input to one or more elements within the terminal 60, or may be configured to transmit data between the terminal 60 and the external apparatus.

The memory 69 may be configured to store a software program as well as every kind of data. The memory 69 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 69 may include a high-speed random access memory, and may further include a non-volatile memory such as at least one magnetic disk storage component, a flash memory component, or another volatile solid-state storage component.

The processor 610 is a control center of the terminal, and connects all parts of the entire terminal by using various interfaces and lines. By running or executing a software program and/or a module stored in the memory 69 and invoking data stored in the memory 69, the processor 610 performs various functions of the terminal and data processing, to perform overall monitoring on the terminal. The processor 610 may include one or more processing units. Optionally, the processor 610 may be integrated with an application processor and a modem processor. The application processor mainly processes the operating system, the user interface, applications, and the like. The modem processor mainly processes wireless communication. It may be understood that, alternatively, the modem processor may not be integrated into the processor 610.

The terminal 60 may further include a power supply 611 (for example, a battery) that supplies power to various components. Optionally, the power supply 611 may be logically connected to the processor 610 through a power supply management system, to perform functions of managing charging, discharging, and power consumption through the power supply management system.

In addition, the terminal 60 includes some function modules that are not shown, which are no longer repeated here.

Figure 7:
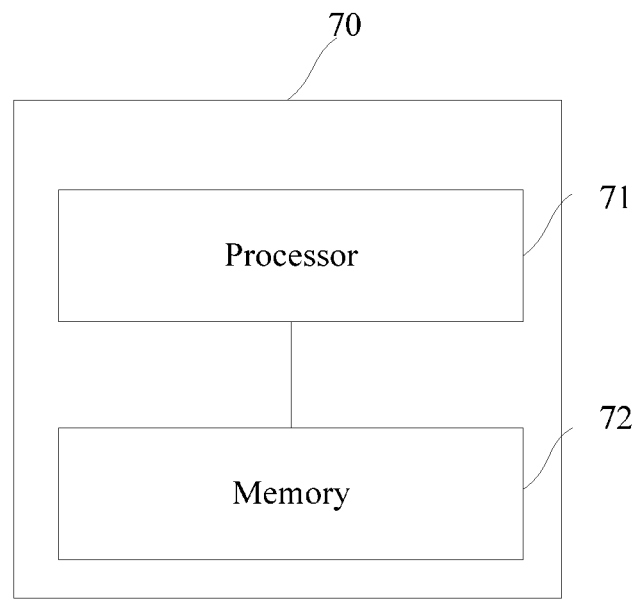
FIG. 7 is a schematic structural diagram of a terminal according to still another embodiment of the present disclosure.

Referring to FIG. 7, FIG. 7 is a schematic structural diagram of a terminal according to still another embodiment of this disclosure. The terminal 70 includes: a processor 71 and a memory 72. In the embodiments of the present disclosure, the terminal 70 further includes: a computer program stored in the memory 72 and executable on the processor 71. When the computer program is executed by the processor 71, the following step is performed:

reporting first information, where the first information is used to indicate a trigger condition for a network side device to determine whether to initiate first paging to the terminal.

The processor 71 is responsible for bus architecture management and general processing. The memory 72 may store data used by the processor 71 when the processor 71 performs an operation.

Optionally, the reporting first information includes:

controlling, by the terminal on a first occasion after a first subscriber identity module SIM card enters a radio resource control RRC connected state, a second SIM card to enter the RRC connected state from a non-connected state, and reporting the first information, where an identifier of the terminal in the first paging is an identifier associated with an RRC entity and/or a non-access stratum NAS entity corresponding to the second SIM card.

Optionally, the trigger condition includes:

service information for triggering initiating the first paging: or service information for quitting initiating the first paging, where the service information includes at least one of a service type, a paging reason, or a QoS class of a service.

Optionally, the first occasion arrives after the NAS entity or the RRC entity corresponding to the second SIM card triggers a location update: or the first occasion arrives after it is detected that there is no data transmission between the first SIM card and the network side device; or the first occasion arrives after paging is received, where an identifier of the terminal in the paging is an identifier associated with the RRC entity and/or the NAS entity corresponding to the second SIM card.

Optionally, when the processor 71 executes the computer program, the following step may be further implemented: After the controlling, by the terminal, a second SIM card to enter the RRC connected state from a non-connected state, and reporting the first information, the method further includes:

controlling the second SIM card to enter the non-connected state from the RRC connected state.

Optionally, when the processor 71 executes the computer program, the following step may be further implemented: After the controlling, by the terminal, the second SIM card to enter the non-connected state from the RRC connected state, the method further includes:

if it is detected that the first SIM card enters the non-connected state from the RRC connected state, or it is detected that a service of the first SIM card is completed, controlling the second SIM card to enter the RRC connected state from the non-connected state, and reporting second information, where the second information is used to instruct the network side device to remove the trigger condition.

Optionally, when the processor 71 executes the computer program, the following step may be further implemented: The controlling, on a first occasion after a first SIM card enters an RRC connected state, a second SIM card to enter the RRC connected state from a non-connected state, and reporting the first information includes:

if a service of the first SIM card is a first service, controlling, on the first occasion after the first SIM card enters the RRC connected state, the second SIM card to enter the RRC connected state from the non-connected state, and reporting the first information.

Optionally, the first service is a service of a specified service type, a specified paging reason, and/or a specified QoS class.

Figure 8:
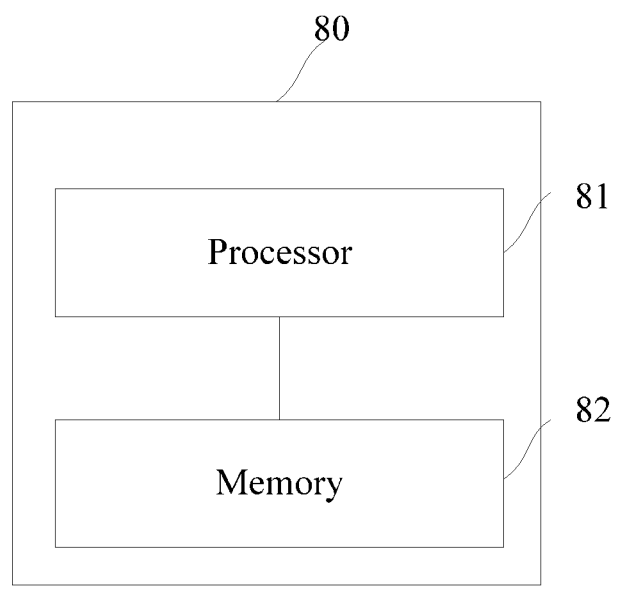
FIG. 8 is a schematic structural diagram of a network side device according to still another embodiment of the present disclosure.

Referring to FIG. 8, FIG. 8 is a schematic structural diagram of a network side device according to another embodiment of the present disclosure. A network side device 80 includes a processor 81 and a memory 82. In this embodiment of the present disclosure, the network side device 80 further includes a computer program that is stored in the memory 82 and executable on the processor 81, and when the processor 81 executes the computer program, the following steps are implemented:

receiving first information, where the first information is used to indicate a trigger condition for a network side device to determine whether to initiate first paging to the terminal;

determining, based on the trigger condition after a service of the terminal arrives, whether to initiate the first paging; and if yes, initiating the first paging; or if no, quitting initiating the first paging.

The processor 81 is responsible for bus architecture management and general processing. The memory 82 may store data used by the processor 81 when the processor 81 performs an operation.

Optionally, when the processor 81 executes the computer program, the following step may be further implemented: An identifier of the terminal in the first paging is an identifier associated with an RRC entity and/or a NAS entity corresponding to the second SIM card; and the determining, based on the trigger condition after a service of the terminal arrives, whether to initiate the first paging includes;

determining, based on the trigger condition after a service of the second SIM card arrives, whether to initiate the first paging.

Optionally, when the processor 81 executes the computer program, the following step may be further implemented: The triggering condition include:

service information for triggering initiating the first paging: or service information for quitting initiating the first paging, where the service information includes at least one of a service type, a paging reason, or a QoS class of a service.

Optionally, when the processor 81 executes the computer program, the following step may be further implemented: Receiving second information, where the second information is used to instruct the network side device to remove the trigger condition.

Optionally, when the processor 81 executes the computer program, the following step may be further implemented: After the receiving second information, the method further includes:

initiating paging after the service of the second SIM card arrives, without determining whether to initiate the paging.

An embodiment of the present disclosure further provides a non-transitory computer-readable storage medium. The non-transitory computer-readable storage medium stores a computer program, and when a processor executes the computer program, the processes of the foregoing paging indication method embodiment are implemented and a same technical effect can be achieved. To avoid repetition, details are not described herein again.

An embodiment of the present disclosure further provides a non-transitory computer-readable storage medium. The non-transitory computer-readable storage medium stores a computer program, and when a processor executes the computer program, the processes of the foregoing paging method embodiment are implemented and a same technical effect can be achieved. To avoid repetition, details are not described herein again.

The non-transitory computer-readable storage medium includes a read-only memory ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the essence of the present disclosure and the protection scope of the claims, all of which fall within the protection of the present disclosure.

What is claimed is:

1. A paging indication method, performed by a terminal and comprising:
reporting first information, wherein the first information is used to indicate a trigger condition for a network side device to determine whether to initiate first paging to the terminal; wherein
the reporting first information comprises:
controlling, by the terminal on a first occasion after a first subscriber identity module (SIM) card enters a radio resource control (RRC) connected state, a second SIM card to enter the RRC connected state from a non-connected state, and to report the first information, wherein an identifier of the terminal in the first paging is an identifier associated with an RRC entity and/or a non-access stratum (NAS) entity corresponding to the second SIM card.

2. The paging indication method according to claim 1, wherein the trigger condition comprises:
service information for triggering initiating the first paging; or
service information for quitting initiating the first paging, wherein
the service information comprises at least one of a service type, a paging reason, or a quality of service (QOS) class of a service.

3. The paging indication method according to claim 1, wherein
the first occasion arrives after the NAS entity or the RRC entity corresponding to the second SIM card triggers a location update; or
the first occasion arrives after it is detected that there is no data transmission between the first SIM card and the network side device; or
the first occasion arrives after paging is received, wherein an identifier of the terminal in the paging is an identifier associated with the RRC entity and/or the NAS entity corresponding to the second SIM card.

4. The paging indication method according to claim 1, wherein after the controlling, by the terminal, a second SIM card to enter the RRC connected state from a non-connected state, and to report the first information, the method further comprises:
controlling the second SIM card to enter the non-connected state from the RRC connected state.

5. The paging indication method according to claim 4, wherein after the controlling, by the terminal, the second SIM card to enter the non-connected state from the RRC connected state, the method further comprises:
if it is detected that the first SIM card enters the non-connected state from the RRC connected state, or it is detected that a service of the first SIM card is completed, controlling, by the terminal, the second SIM card to enter the RRC connected state from the non-connected state, and to report second information, wherein the second information is used to instruct the network side device to remove the trigger condition.

6. The paging indication method according to claim 1, wherein the controlling, by the terminal on a first occasion after a first SIM card enters an RRC connected state, a second SIM card to enter the RRC connected state from a non-connected state, and reporting the first information comprises:
if a service of the first SIM card is a first service, controlling, by the terminal on the first occasion after the first SIM card enters the RRC connected state, the second SIM card to enter the RRC connected state from the non-connected state, and reporting the first information.

7. The paging indication method according to claim 6, wherein the first service is a service of a specified service type, a specified paging reason, and/or a specified quality of service (QoS) class.

8. The paging indication method according to claim 1, wherein the network side device comprises a core network device;
the reporting first information comprises:
reporting the first information to the core network device; wherein
the identifier of the terminal in the first paging is an identifier associated with the NAS entity corresponding to the second SIM card.

9. A paging method, performed by a network side device and comprising:
receiving first information, wherein the first information is used to indicate a trigger condition for the network side device to determine whether to initiate first paging to a terminal;
determining, based on the trigger condition after a service of the terminal arrives, whether to initiate the first paging; wherein
an identifier of the terminal in the first paging is an identifier associated with a radio resource control (RRC) entity and/or a non-access stratum (NAS) entity corresponding to a second subscriber identity module (SIM) card; and
the determining, based on the trigger condition after a service of the terminal arrives, whether to initiate the first paging comprises:
determining, based on the trigger condition after a service of the second SIM card arrives, whether to initiate the first paging.

10. The paging method according to claim 9, wherein the trigger condition comprises:
service information for triggering initiating the first paging; or
service information for quitting initiating the first paging, wherein
the service information comprises at least one of a service type, a paging reason, or a quality of service (QOS) class of a service.

11. The paging method according to claim 9, further comprising:
receiving second information, wherein the second information is used to instruct the network side device to remove the trigger condition.

12. The paging method according to claim 11, wherein after the receiving second information, the method further comprises:
initiating paging after the service of the second SIM card arrives, without determining whether to initiate the paging.

13. The paging method according to claim 9, wherein the determining, based on the trigger condition after a service of the terminal arrives, whether to initiate the first paging comprises:
if determine to not initiate the first paging, quitting initiating the first paging.

14. A terminal, comprising a processor, a memory, and a computer program that is stored in the memory and executable on the processor, wherein the computer program, when executed by the processor, causes the terminal to perform:
reporting first information, wherein the first information is used to indicate a trigger condition for a network side device to determine whether to initiate first paging to the terminal; wherein
the reporting first information comprises:
controlling, by the terminal on a first occasion after a first subscriber identity module (SIM) card enters a radio resource control (RRC) connected state, a second SIM card to enter the RRC connected state from a non-connected state, and to report the first information, wherein an identifier of the terminal in the first paging is an identifier associated with an RRC entity and/or a non-access stratum (NAS) entity corresponding to the second SIM card.

15. The terminal according to claim 14, wherein the trigger condition comprises:
service information for triggering initiating the first paging; or
service information for quitting initiating the first paging, wherein
the service information comprises at least one of a service type, a paging reason, or a quality of service (QOS) class of a service.

16. The terminal according to claim 14, wherein
the first occasion arrives after the NAS entity or the RRC entity corresponding to the second SIM card triggers a location update; or
the first occasion arrives after it is detected that there is no data transmission between the first SIM card and the network side device; or
the first occasion arrives after paging is received, wherein an identifier of the terminal in the paging is an identifier associated with the RRC entity and/or the NAS entity corresponding to the second SIM card.

17. The terminal according to claim 14, wherein the computer program, when executed by the processor, causes the terminal to further perform:
controlling the second SIM card to enter the non-connected state from the RRC connected state, after controlling the second SIM card to enter the RRC connected state from the non-connected state and reporting the first information.

18. The terminal according to claim 17, wherein the computer program, when executed by the processor, causes the terminal to further perform:
after the controlling the second SIM card to enter the non-connected state from the RRC connected state, if it is detected that the first SIM card enters the non-connected state from the RRC connected state, or it is detected that a service of the first SIM card is completed, controlling the second SIM card to enter the RRC connected state from the non-connected state, and to report second information, wherein the second information is used to instruct the network side device to remove the trigger condition.

19. The terminal according to claim 14, wherein the computer program, when executed by the processor, causes the terminal to perform:
if a service of the first SIM card is a first service, controlling, by the terminal on the first occasion after the first SIM card enters the RRC connected state, the second SIM card to enter the RRC connected state from the non-connected state, and reporting the first information.

20. The terminal according to claim 19, wherein the first service is a service of a specified service type, a specified paging reason, and/or a specified quality of service (QOS) class.

* * * * *